(12) United States Patent
Dupuis

(10) Patent No.: US 7,316,188 B2
(45) Date of Patent: Jan. 8, 2008

(54) DEDENSIFICATION AND DELIVERY UNIT

(76) Inventor: Mark A. Dupuis, 120 Woodcliff Dr., Westfield, MA (US) 01085

( * ) Notice: Subject to any disclaimer, the term of this patent is extended or adjusted under 35 U.S.C. 154(b) by 232 days.

(21) Appl. No.: 11/160,061

(22) Filed: Jun. 7, 2005

(65) Prior Publication Data
US 2005/0271374 A1    Dec. 8, 2005

Related U.S. Application Data

(60) Provisional application No. 60/576,896, filed on Jun. 7, 2004.

(51) Int. Cl.
F23K 1/00 (2006.01)
(52) U.S. Cl. .................. 110/106; 110/110; 110/101 R; 110/101 CF
(58) Field of Classification Search ............ 110/101 R, 110/106, 110, 232, 101 CF, 342, 347
See application file for complete search history.

(56) References Cited

U.S. PATENT DOCUMENTS

| | | | |
|---|---|---|---|
| 4,341,199 A | 7/1982 | Hand, Jr. et al. | |
| 4,395,956 A | 8/1983 | Hand, Jr. et al. | |
| 4,475,471 A | 10/1984 | Hand, Jr. et al. | |
| 4,589,357 A * | 5/1986 | Lincoln et al. | 110/347 |
| 4,852,815 A | 8/1989 | Giannotti | |
| 5,028,299 A | 7/1991 | Guidat et al. | |
| 5,205,495 A | 4/1993 | Garnier | |
| 5,233,932 A | 8/1993 | Robertson | |
| 5,484,112 A | 1/1996 | Koenig | |
| 5,788,169 A | 8/1998 | Koenig | |
| 5,992,335 A | 11/1999 | Nakamura et al. | |
| 6,085,672 A | 7/2000 | Nakamura et al. | |
| 6,536,692 B2 | 3/2003 | Owens | |
| 6,540,798 B2 | 4/2003 | Asanuma et al. | |
| 6,660,052 B1 | 12/2003 | Nakamura et al. | |
| 2002/0033124 A1 | 3/2002 | Asanuma et al. | |

* cited by examiner

Primary Examiner—Kenneth Rinehart
(74) Attorney, Agent, or Firm—Deborah A. Basile; Karen K. Chadwell

(57) ABSTRACT

A dedensification and delivery unit for the conversion of an alternative fuel source into fuel, comprising: a dedensification area for separating a densified alternative fuel source into its component parts to form a dedensified alternative fuel source; a compression area for holding the dedensified alternative fuel source; a refining area for further shaping a size of the dedensified alternative fuel source to form a refined alternative fuel source; and a delivery area for delivering the refined alternative fuel source into a burner.

7 Claims, 5 Drawing Sheets

US 7,316,188 B2

DEDENSIFICATION AND DELIVERY UNIT

CROSS REFERENCE TO RELATED APPLICATIONS

This application claims the benefit of U.S. Provisional Application No. 60/576,896 filed on Jun. 7, 2004.

BACKGROUND OF THE INVENTION

1. Field of the Invention

The present invention relates generally to a fuel generating system. More specifically, the invention relates to a fuel generating system comprising a dedensification and delivery unit that dedensifies and delivers an alternative fuel source to a burner.

2. Background of the Invention

Paper derived fuel is currently used in many parts of the world. This is generally accomplished by combusting the paper in the bottom of Stoker boilers. The problem with this practice, however, is that burning paper on the bottom of the Stoker boiler results in very poor quality emissions to the environment. Accordingly, such practices have become disfavored in the United States.

Rather than using Stoker boilers, most United States' processing plants use pulverized coal fired boilers. These types of boilers combust coal in suspension after the coal is pulverized into a fine powder consistency. The problem with this method of fuel generation, however, is that it is financially expensive, it depletes the environment of natural resources, and it results in polluting residues. Accordingly, what is needed is a system that can generate fuel in a cost-effective manner, while reducing the air emissions. Also, what is needed is a system that can utilize an alternative fuel source, such as inorganic or organic materials consisting of virgin, pre-consumer, post-consumer materials extracted from municipal solid waste streams as further defined herein, wood, leaves, and the like, and as referred to as alternate fuel (AF source) sources, thereby reducing the amount of recyclable material being disposed in landfills, and preserving fossil fuels.

SUMMARY OF THE INVENTION

The above-discussed and other drawbacks and deficiencies of the prior art are overcome or alleviated by a dedensification and delivery unit for the conversion of an alternative fuel source into fuel, comprising: a dedensification area for separating a densified alternative fuel source into its component parts to form a dedensified alternative fuel source; a compression area for holding the dedensified alternative fuel source; a refining area for further shaping a size of the dedensified alternative fuel source to form a refined alternative fuel source; and a delivery area for delivering the refined alternative fuel source into a burner.

DETAILED DESCRIPTION OF THE INVENTION

Figure 1:
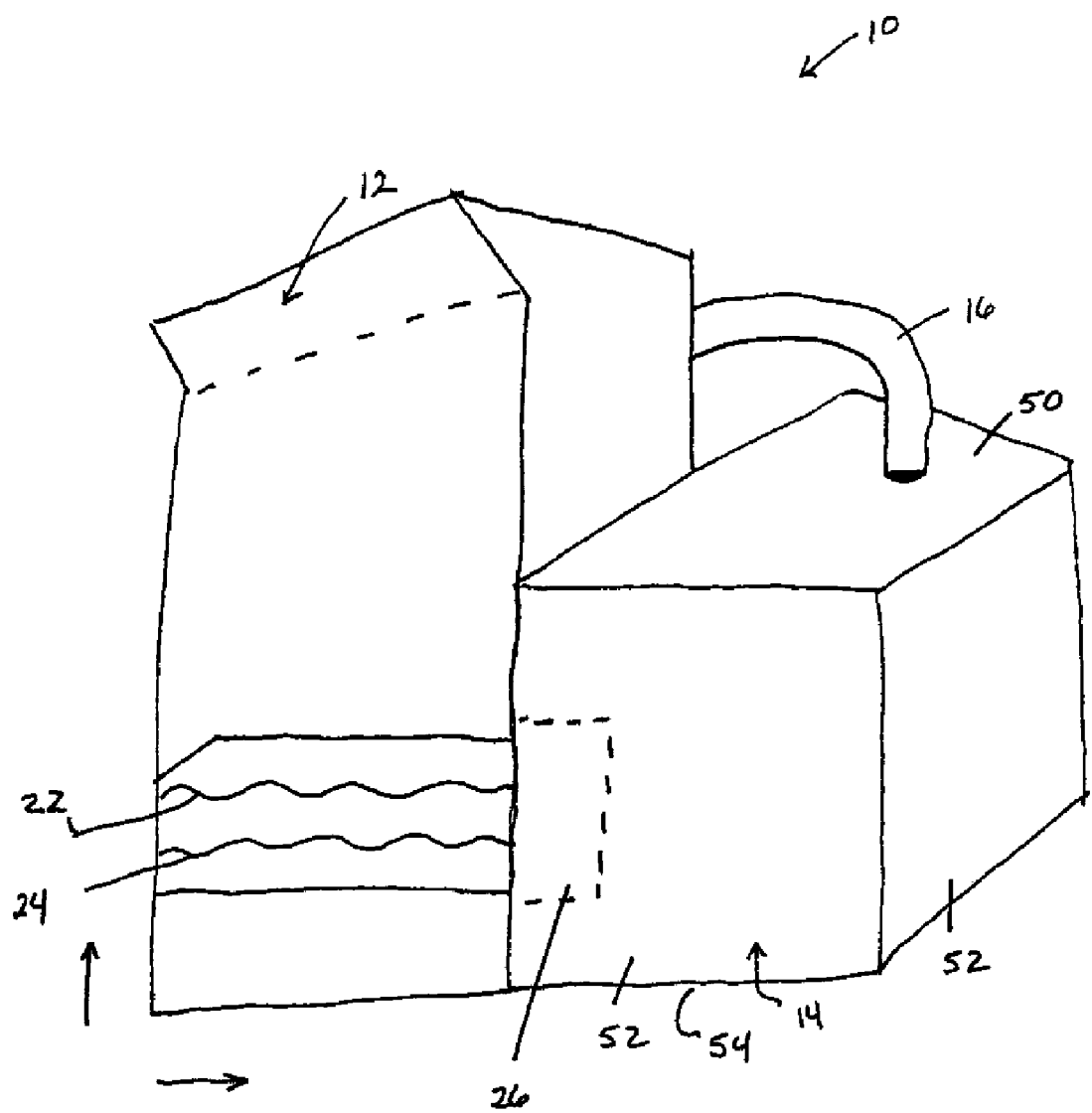
FIG. 1 is a pictorial representation of an exemplary dedensification and delivery unit.
Figure 2:
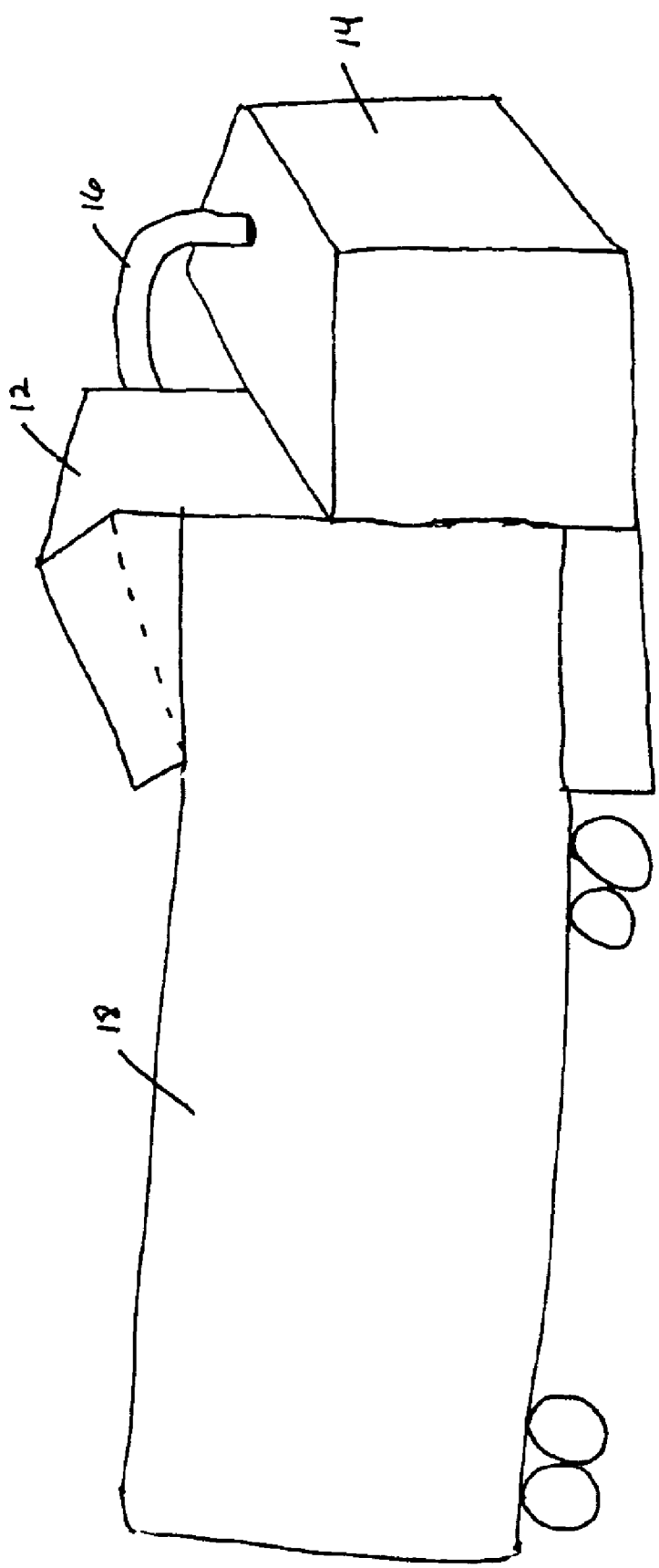
FIG. 2 is a pictorial representation depicting an exemplary method of transporting a densified AF source to an exemplary dedensification and delivery unit.
Figure 3:
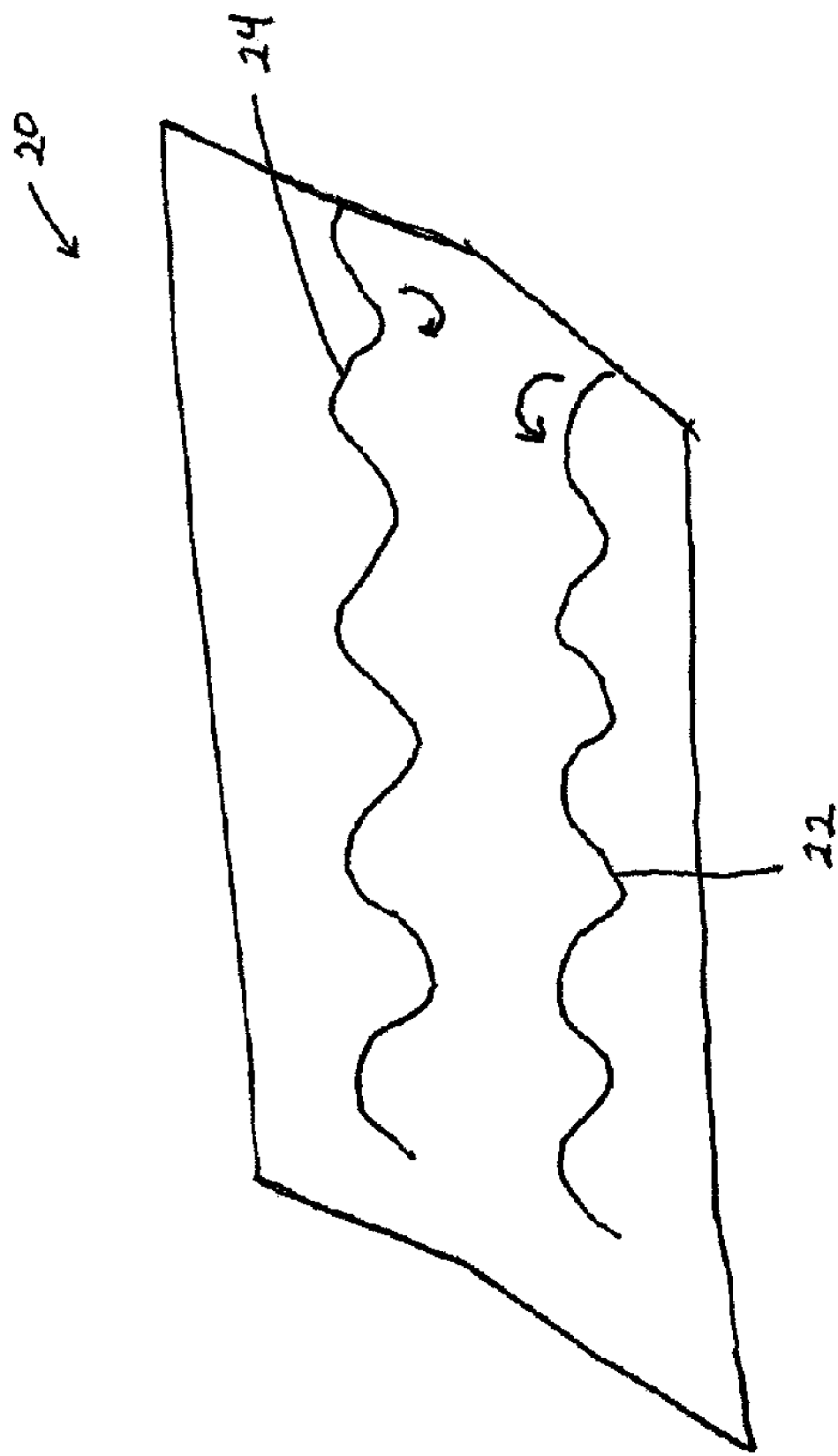
FIG. 3 is a schematic depicting an exemplary dedensification area.

In general, disclosed herein is a fuel generating system capable of utilizing an alternate fuel ("AF") source to generate fuel. The fuel generating system principally operates by dedensifying an AF source and delivering the dedensified AF source to a burner, wherein upon entering the burner, the AF source is suspended and preferably remains suspended until it is combusted. Such dedensification and delivery of the AF source occurs via the novel dedensification and delivery unit ("DDU") to be disclosed herein. In an exemplary application of the present invention, the heat generated from the combustion of the dedensified and suspended AF source may be used to heat water in which to generate electricity.

The AF source is defined as any inorganic or organic materials comprised of virgin, pre-consumer, post-consumer, screened, classified and unclassified material extracted from municipal solid waste ("MSW") streams, and material from MSW and non-MSW streams, scrap material and by-products from manufacturing processes. Specific examples of AF sources include, but are not limited to, grass-like materials, switch grasses, vegetation, leaves, yard debris material, farming by-products, agricultural crops or low or negative cost industrial residues, classified materials from MSW plants, wood, tree bark, pallets, paper, coated paper, laminated and waxed paper, fiber, textiles, fabrics, cardboard, chip board, short fiber, plastics, films, polymers, milk containers, oil bottles, coatings, wax, fossil fuels, tar, oil, grease, animal derived fats, oils, or grease, any and all combustible materials suitable for providing fuel for combustion for creation of steam, electric power, process heat, kilns, or other conversion processes that could use the fuel as an energy source.

Additionally, the AF source may be provided from a variety of commercial, industrial, or consumer sources. The AF source may have been used originally for any number of purposes, and may comprise a wide variety of structural and compositional forms. As the fuel generating system utilizes waste, it reduces the amount of waste accumulation in landfills. Additionally, the use of an AF source reduces toxic emissions.

The burner used in the application of the DDU disclosed herein may be any and all solid fuel combustion chambers, furnaces, vessels, kilns, boilers, reactors, incinerators, heat exchangers, and any other device suitable for burning solid fuel for any purpose and regardless of the manner of feeding or stoking. However, particularly preferred burners comprise combustion chambers and conventional pulverized coal fired and wood boilers used for the generation of steam and electricity.

To maximize the fuel generating potential of the AF source, the AF source is preferably suspendable in the burner. Accordingly, the AF source preferably comprises a material size sufficient to allow the AF source to be suspended in the burner up until the point of the AF source's combustion. However, because a processing plant typically does not have the resources to prepare AF sources having the appropriate material sizes necessary for suspension, nor the resources to store the AF sources, it is contemplated herein that the AF source arrives at the processing plant in a densified form, wherein the densified form comprises tightly compressed pieces/shreds of the AF source in a unified compact form, wherein a exemplary unified compact form comprises individual cubed shape components each comprising compacted pieces of the AF source. It is contemplated that the AF source arrives at the processing plant in a densified form, rather than in individual pieces or strips of AF, as it is easier to collect, store, transport, and deliver the AF source to the processing plant in the densified form.

Densification of the AF source may occur through a variety of means. However, in a preferred embodiment, the means for densifying the AF source comprises a shredder, wherein the AF source is shred into strips; a pelletizer for compressing a plurality of AF source strips into a densified form, wherein a cubed form is particularly preferred; and a holding area for storing the cubed AF source.

Where densification of the AF source occurs off-site, the densified AF may be delivered to the processing plant via a delivery vehicle. The delivery vehicle preferably comprises a hopper component, whereby the densified AF source may be stored indefinitely until the time comes to dedensify the densified AF source.

Once it comes time to generate fuel form the AF source, but prior to delivery of the densified AF source into the fuel-generating burner, the densified AF source passes through the DDU. The DDU contains AF source handling equipment designed to mete, convey, chop, shred, chip, granulate, tear, dedensify and reduce the material size of the densified AF source, wherein the final material size of the dedensified AF source will depend upon the desired fuel type and the material size acceptable to the particular combustion process. Accordingly, the DDU is designed to mete, convey, chop, shred, chip, granulate, tear, dedensify, and reduce the material size of the densified AF source according to the type of fuel to be generated. The equipment contained in a DDU may include one or multiple conveyance, metering and material/fuel size reduction equipment depending on the fuel characteristics required in each specific application. In an exemplary embodiment, the burner burns about 1-7 tons of the dedensified AF source in about 1 hour.

More particularly, the DDU comprises a metering area comprising means to convey a certain quantity of densified AF source into the contained DDU, a dedensification area comprising means to dedensify the densified AF source, a compression area comprising means to compress and hold the dedensified AF source while preventing the dedensified AF source from moving back into the dedensification area, a refining area comprising means to further shape the dedensified AF source to the desired dimensions, and a delivery area comprising means to transport the properly sized AF source to a burner.

In an exemplary embodiment, the metering area comprises a conveyor that transports the densified AF source to the dedensification area. From the metering area, the densified AF source is preferably extruded into the dedensification area where the densified AF source is decompressed such that the individual pieces of the AF source are separated out from the compressed AF source. In an exemplary embodiment, the dedensification area comprises one or more augers. As the augers move, preferably in opposite directions from one another, the AF source decompresses and dedensifies. The dedensified AF source is then conveyed to the compression area comprising a compression box. The rotational speed of the augers determines the size and amount of the dedensified AF source which is ultimately fed into the compression box. Such rotational speed may be controlled by a remote dial located in a control room.

In an exemplary embodiment, the augers force the dedensified AF source into the compression box. As the augers compress the dedensified AF source into the compression box, an air dam is formed. The air dam moves forward in the direction of the flow of the dedensified AF source. The air pressure built up by the air dam prevents the dedensified AF source from moving back into the dedensification area.

The dedensified AF source exits the compression box and enters the refining area, where it is further sized for the particular application. The refining area may comprise at least one of a chipper, a granulator, a shredder, a hammer mill, a blower, and the like, and combinations comprising at least one of the following. In an exemplary embodiment, the refining area comprises a series of chippers, wherein the first chipper in the series shreds the AF source to a particular size, and each subsequent chipper shreds the AF source into even smaller sized parts than the immediately preceding chipper. In an exemplary embodiment, the refining area comprises a series of three chippers. The delivery area, which preferably comprises at least one high pressure, low volume blower hose in communication with the refining area and the burner, conveys the AF source to the burner via air or other means. Preferably, the AF source is blown into suspension in the burner, where the AF source remains in suspension prior to combustion.

In order to more specifically describe the DDU, reference will be made to the Figures and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, an exemplary DDU 10 is a transportable unit (as shown by the arrows depicted in FIG. 1), wherein unit 10 can be delivered to the processing plant and installed therein. Unit 10 is a self-contained shredding and pneumatic system that delivers cubed AF source from the cargo areas of delivery vehicles to the processing plants' burners. Unit 10 comprises a dedensification housing 12 connected to a post-dedensification processing housing 14. Unit 10 further comprises a delivery conduit 16 that connects post-dedensification processing housing 14 to a burner.

Referring to FIGS. 1 and 2, a cargo portion 18 of a delivery vehicle is positioned near dedensification housing 12 such that the cubed AF source may be readily disposed from cargo portion 18 into dedensification housing 12. Once the cubed AF source is placed into dedensification housing 12, one or more augers, which are positioned within dedensification housing 12, are used to decompress the cubed AF source, and may additionally be used to further shred the decompressed AF source. Referring to FIG. 3, an exemplary dedensification housing 20 houses a first auger 22 in parallel alignment with a second auger 24. First auger 22 preferably rotates in a clockwise or a counterclockwise direction and second auger 24 preferably moves in a direction that is opposite to auger 22 (FIG. 3 depicts the movement of augers 22 and 24 by arrows). In this fashion, the AF source can be readily separated out of its cubed form, and the de-cubed AF source may be further shredded.

Referring to FIG. 4, once the cubed AF source has been dedensified, or de-cubed, in dedensification housing 12, it is delivered to post-dedensification processing housing 14. In a refining area 15, the AF source is finely shredded such that the AF source is sufficiently lightweight such that it can be suspended when blown into the burner. It is desirable to prevent the AF source from sinking to the bottom floor of the burner in order to increase the efficiency of the AF source's combustion. Accordingly, the finer the AF source is shredded, the less likely is the AF source to fall to the bottom of the burner.

Post-dedensification processing housing 14 comprises a compression tank 26 located within a compression area 17. De-densified AF source from dedensification area 12 is fed into compression tank 26 from augers 22 and 24. Here, the dedensified AF source is compacted and flow of the AF source from compression tank 26 back into dedensification housing 12 is prevented.

Figure 4:
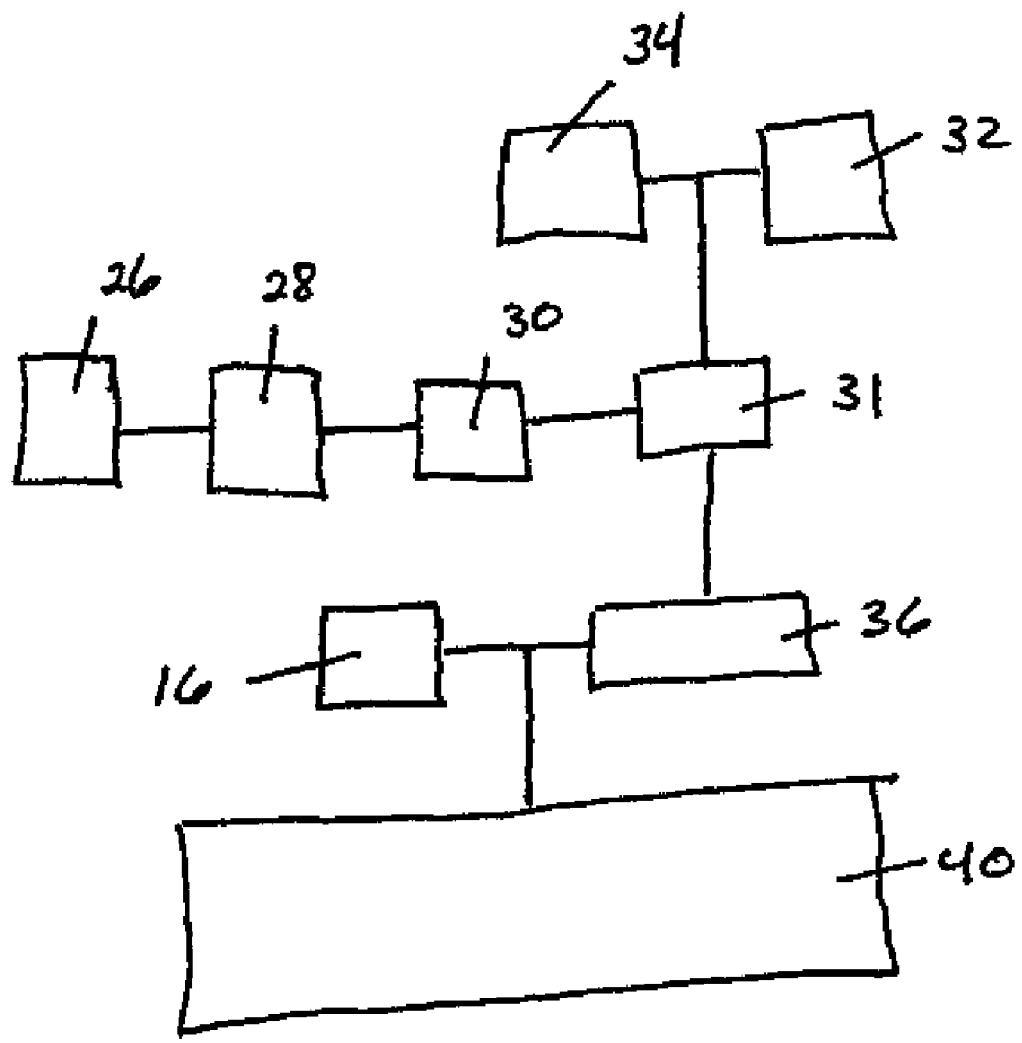
FIG. 4 is a schematic depicting an exemplary refining area, compression area, and delivery area.
Figure 5:
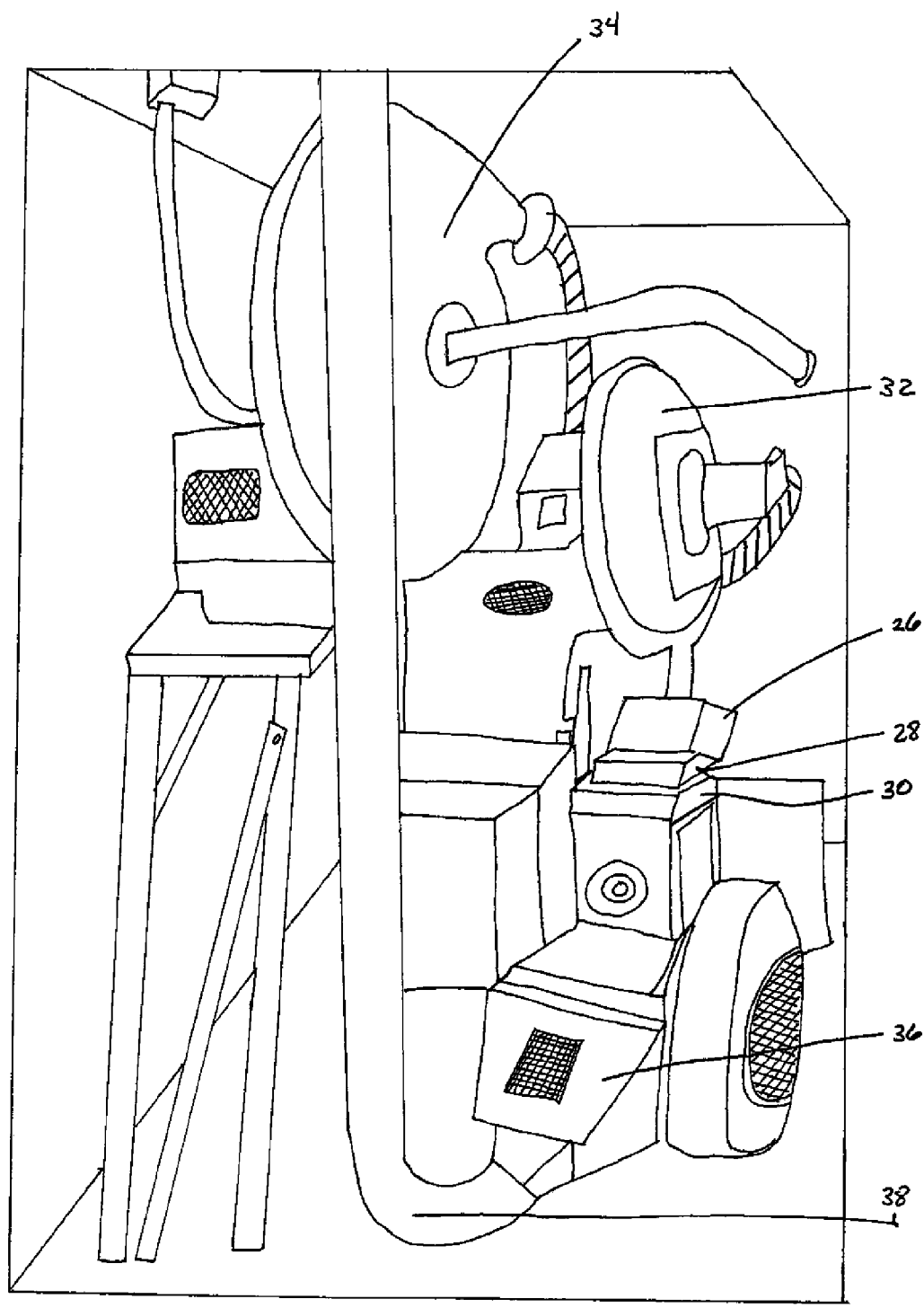
FIG. 5 is a schematic depicting an exemplary post-dedensification processing housing and its exemplary component parts.

Refining area 15 of post-dedensification processing housing 14 comprises a first wood chipper 28 in series with a second wood chipper 30 and a third wood chipper 31. Wood chippers 28, 30, and 31 are preferably modified conventional wood chippers, wherein chippers 28, 30, and 31 comprise additional blades in order to shred the AF source more finely than otherwise would be achieved by conventional wood chippers. For example, while in third wood chipper 31, the AF source may be shredded to the point of dust. Refining area 15 further comprises a first blower 32 and a second blower 34, wherein blowers 32 and 34 are in series with third wood chipper 31. Although FIG. 4 depicts three chippers and two blowers, any number of chipper or blower may be utilized to obtain the proper size dimensions. Additionally, refining area 15 comprises a chute 36 which connects third wood chipper 31 with a delivery conduit 16. It is herein noted that although an exemplary refining area has been described as comprising three wood chippers and two blowers, any number of chippers and/or blowers may be utilized, wherein the number depends on how fine the AF source is to be shredded.

In an exemplary embodiment, AF source contained in compression tank 26 is carried from first wood chipper 28 into second wood chipper 30, and into third wood chipper 31. First and second blowers 32 and 34 blow air through third wood chipper 31 thereby effectively blowing the AF source through wood chippers 30 and 32, through chute 36, and through conduit 38 out into a burner 40.

As the AF source can be finely shredded in the DDU, the AF source can stay suspended longer in the burner as compared to traditionally used AF sources. Additionally, during the dedensification process in the dedensification area, and the refining process in the refining area, the AF source is treated such that it is air-deprived, e.g., the ratio of air to the AF source is about 2 pounds of air to about 1 pound of the AF source. Accordingly, once the AF source is exposed to the burner, combined with the fact that the AF source is of very fine size, e.g., the AF source ranges in size from dust to about $1/2 \times 1/2 \times 1/16$ inch, the AF source can burn almost immediately. For example, where the burner is about 2,800-3,000 degrees Fahrenheit, the AF source can combust in under about 1 second.

Furthermore, in addition to the embodiments described herein, it is further contemplated that the dedensification and delivery unit may comprise a variety of safety features. For example, the dedensification area and/or the refining area may comprise a sprinkler system to prevent the spread of fires that may result from the use of the unit. Additionally, the dedensification area may comprise overhead doors that may automatically close when the unit is in operation, thereby, preventing unit operators from falling into the dedensification area.

In an exemplary embodiment, the DDU described herein accepts both loose and densified AF sources ranging from 1 pound per cubic foot ("lb/ft$^3$") to 50 lbs/ft$^3$. An exemplary AF source comprises cubed paper having a density of approximately 22 lbs/ft$^3$, and a dimensional size of approximately 1-2.5 inches×1-2.5 inches to about 2-3 inches×2-3 inches. After the dedensified AF source has been subjected to the refining area, the AF source preferably has a size of about 1/16 inch to about 1/8 inch, wherein such a size is ideal for suspension.

In an exemplary embodiment, the DDU is portable and compact in design and allows for complete installation at the processing plant in about 1-3 days at an insignificant capital cost to the customer. Furthermore, the DDU may be designed to be independently and completely controlled from any location or control room. Also, the DDU may be designed such that any solid fuel burning processing plant or any solid fuel combustion chamber can utilize an AF source without the need to co-mingle the fuel with the primary fuel and its equipment. Although it is intended that the DDU operate completely independently from the existing operations, it can be electrically connected to interact with the existing operations.

The foregoing description of the invention is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The DDU as described herein has a variety of benefits. For example, the DDU may be controlled directly from the control room of the processing plant with the ability to determine the effect on all aspects of combustion and emissions. The DDU can be installed in the processing plant in just a few days with no disruption to the existing operations. Additionally, the DDU has very positive results on emissions, this due in part to the fact that the DDU provides for a low air environment. Furthermore, the DDU is an efficient fuel preparing source, where a burner can burn about 1 to about 7 tons of the dedensified AF source prepared by the DDU in about 1 hour. And the cost of the DDU, including the cost of the densified AF source, is less than typical fuel costs.

What is claimed is:

1. A dedensification and delivery unit, comprising:
    a dedensification housing for separating a densified alternative fuel source into its component parts to form a dedensified alternative fuel source, wherein the dedensification housing holds a plurality of augers; and
    a post-dedensification processing housing comprising:
        a compression area for holding the dedensified alternative fuel source, wherein the compression area comprises a compression tank, wherein the plurality of augers feed the dedensified alternative fuel source directly into the compression tank;
        a refining area for further shaping a size of the dedensified alternative fuel source to form a refined alternative fuel source, wherein the refining area comprises a plurality of chippers aligned in series such that each subsequent chipper shreds the dedensified alternative fuel source into smaller parts than the immediately preceding chipper, and wherein the dedensified alternative fuel source is fed from the compression tank into a first chipper of the plurality of chippers; and
        a delivery area for delivering the refined alternative fuel source into a burner;

wherein the dedensification housing and the post-dedensification processing housing directly abut each other such that the dedensified alternative fuel source is directly fed from the dedensification housing into the compression area of the post-dedensification processing housing.

2. The dedensification and delivery unit of claim 1, wherein the delivery area comprises one or more blowers, wherein the one or more blowers provide an air current that blows the dedensified alternative fuel source through the plurality of chippers.

3. The dedensification and delivery unit of claim 2, wherein the delivery unit further comprises a chute and a conduit, wherein the chute is in communication with the plurality of chippers, and wherein the conduit extends from the chute and leads to a burner.

4. The dedensification and delivery unit of claim 3, wherein the dedensification and delivery unit is portable.

5. The dedensification and delivery unit of claim 2, wherein the delivery area comprises a first blower and a second blower, wherein the second blower comprises a conduit that extends from a main body of the second blower to a port that leads to the outside of the post-dedensification processing housing, and wherein the delivery area further comprises a hose that connects the first blower to the second blower, and wherein the air current generated by the second blower flows into a main body of the first blower via the hose.

6. The dedensification and delivery unit of claim 5, wherein the delivery unit further comprises a chute and a delivery conduit, wherein the chute is in communication with the plurality of chippers, and wherein the delivery conduit extends from the chute and through a ceiling of the post-densification processing housing and leads to a burner; and further wherein the air current flows through the main body of the first blower and into the chute, thereby causing the respective dedensified alternative fuel source and refined alternative fuel source to move through the plurality of chippers, through the chute, and through the delivery conduit, and into the burner.

7. The dedensification and delivery unit of claim 6, wherein the dedensification and delivery unit is portable.

* * * * *